US010696266B2

(12) United States Patent
Enders et al.

(10) Patent No.: US 10,696,266 B2
(45) Date of Patent: Jun. 30, 2020

(54) INFLATABLE KNEE AIRBAG ASSEMBLIES

(71) Applicant: Autoliv ASP, Inc., Ogden, UT (US)

(72) Inventors: Mark L. Enders, Pleasant View, UT (US); Quin Soderquist, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 110 days.

(21) Appl. No.: 15/809,723

(22) Filed: Nov. 10, 2017

(65) Prior Publication Data

US 2019/0143931 A1 May 16, 2019

(51) Int. Cl.
*B60R 21/2338* (2011.01)
*B60R 21/206* (2011.01)
*B60R 21/231* (2011.01)

(52) U.S. Cl.
CPC ........ *B60R 21/2338* (2013.01); *B60R 21/206* (2013.01); *B60R 2021/23169* (2013.01); *B60R 2021/23386* (2013.01)

(58) Field of Classification Search
CPC ... B60R 21/206; B60R 21/213; B60R 21/232; B60R 21/2338; B60R 2021/0051; B60R 2021/0053; B60R 2021/161; B60R 2021/23169; B60R 2021/23386
See application file for complete search history.

(56) References Cited

U.S. PATENT DOCUMENTS

| 3,858,822 A | 1/1975 | Wood |
| 3,904,222 A | 9/1975 | Bursott et al. |
| 3,966,227 A | 6/1976 | Cameron |
| 4,290,627 A | 9/1981 | Cumming et al. |
| 5,338,061 A | 8/1994 | Nelson et al. |
| 5,344,184 A | 9/1994 | Keeler et al. |
| 5,427,410 A | 6/1995 | Shiota et al. |
| 5,460,400 A | 10/1995 | Davidson |
| 5,529,337 A | 6/1996 | Takeda et al. |
| 5,669,627 A | 9/1997 | Marjanski et al. |
| 5,690,354 A | 11/1997 | Logan et al. |
| 5,765,867 A | 6/1998 | French |
| 5,772,239 A | 6/1998 | Seymour |
| 5,803,487 A | 9/1998 | Kikuchi et al. |
| 5,810,390 A | 9/1998 | Enders et al. |
| 5,823,566 A | 10/1998 | Manire |
| 5,845,935 A | 12/1998 | Enders et al. |
| 5,927,748 A | 7/1999 | O'Driscoll |
| 6,010,147 A | 1/2000 | Brown |
| 6,059,312 A | 5/2000 | Staub et al. |

(Continued)

FOREIGN PATENT DOCUMENTS

| DE | 202006014012 U1 | 2/2008 |
| DE | 102008029810 A1 | 12/2009 |

(Continued)

*Primary Examiner* — Laura Freedman

(74) *Attorney, Agent, or Firm* — Stoel Rives LLP

(57) ABSTRACT

An inflatable airbag assembly, such as a knee airbag assembly, including a support strap, wherein the support strap may be secured to an inflatable airbag cushion. The support strap may be configured to direct the deployment trajectory of the airbag cushion such that the airbag cushion is deployed rearwardly and upwardly within a vehicle. The inflatable airbag assembly may be configured to prevent injury to an occupant's hip, femur, knee, and/or lower leg.

29 Claims, 11 Drawing Sheets

(56) References Cited

U.S. PATENT DOCUMENTS

| | | | |
|---|---|---|---|
| 6,135,495 A | 10/2000 | Redgrave et al. | |
| 6,155,595 A | 12/2000 | Schultz | |
| 6,213,496 B1 | 4/2001 | Minami et al. | |
| 6,217,059 B1 | 4/2001 | Brown et al. | |
| 6,224,129 B1 | 5/2001 | Cisternino et al. | |
| 6,254,121 B1 | 7/2001 | Fowler et al. | |
| 6,299,205 B1 | 10/2001 | Keshavaraj | |
| 6,364,348 B1 | 4/2002 | Jang et al. | |
| 6,431,583 B1 | 8/2002 | Schneider | |
| 6,454,296 B1 | 9/2002 | Tesch et al. | |
| 6,464,255 B1 | 10/2002 | Preisler et al. | |
| 6,474,686 B1 | 11/2002 | Higuchi et al. | |
| 6,494,484 B2 | 12/2002 | Bosgieter et al. | |
| 6,588,793 B2 | 7/2003 | Rose | |
| 6,631,920 B1 | 10/2003 | Webber et al. | |
| 6,648,371 B2* | 11/2003 | Vendely | B60R 21/217 280/739 |
| 6,655,711 B1 | 12/2003 | Labrie et al. | |
| 6,682,093 B2 | 1/2004 | Tajima et al. | |
| 6,685,217 B2 | 2/2004 | Abe | |
| 6,715,789 B2 | 4/2004 | Takimoto et al. | |
| 6,746,045 B2* | 6/2004 | Short | B60R 21/276 280/736 |
| 6,752,417 B2 | 6/2004 | Takimoto et al. | |
| 6,846,005 B2 | 1/2005 | Ford et al. | |
| 6,877,765 B2 | 4/2005 | Rose et al. | |
| 6,913,280 B2 | 7/2005 | Dominissini et al. | |
| 6,945,557 B2 | 9/2005 | Takimoto et al. | |
| 6,959,944 B2 | 11/2005 | Mori et al. | |
| 6,962,363 B2 | 11/2005 | Wang et al. | |
| 6,962,366 B2 | 11/2005 | Fukuda et al. | |
| 7,000,945 B2 | 2/2006 | Bakhsh et al. | |
| 7,000,947 B2 | 2/2006 | Kumagai et al. | |
| 7,011,337 B2* | 3/2006 | Aoki | B60R 21/04 280/728.2 |
| 7,017,945 B2* | 3/2006 | DePottey | B60R 21/276 280/739 |
| 7,029,026 B2 | 4/2006 | Morita | |
| 7,055,851 B2 | 6/2006 | Takimoto et al. | |
| 7,083,188 B2* | 8/2006 | Henderson | B60R 21/201 280/728.2 |
| 7,131,664 B1 | 11/2006 | Pang et al. | |
| 7,147,247 B2 | 12/2006 | Hayakawa | |
| 7,156,418 B2 | 1/2007 | Sato et al. | |
| 7,175,195 B2 | 2/2007 | Morita | |
| 7,182,365 B2 | 2/2007 | Takimoto et al. | |
| 7,185,912 B2 | 3/2007 | Matsuura et al. | |
| 7,195,275 B2 | 3/2007 | Abe | |
| 7,195,280 B2 | 3/2007 | Wheelwright et al. | |
| 7,201,396 B2 | 4/2007 | Takimoto et al. | |
| 7,226,077 B2 | 6/2007 | Abe | |
| 7,232,149 B2 | 6/2007 | Hotta et al. | |
| 7,261,318 B2 | 8/2007 | Enders | |
| 7,281,734 B2 | 10/2007 | Abe et al. | |
| 7,314,228 B2 | 1/2008 | Ishiguro et al. | |
| 7,314,230 B2 | 1/2008 | Kumagai et al. | |
| 7,347,444 B2 | 3/2008 | Wheelwright | |
| 7,354,064 B2* | 4/2008 | Block | B60R 21/23 280/739 |
| 7,370,881 B2 | 5/2008 | Takimoto et al. | |
| 7,374,201 B2 | 5/2008 | Chausset | |
| 7,374,202 B2 | 5/2008 | Lim | |
| 7,377,546 B2* | 5/2008 | Fischer | B60R 21/233 280/736 |
| 7,380,813 B2 | 6/2008 | Lanzinger et al. | |
| 7,384,065 B2 | 6/2008 | Takimoto et al. | |
| 7,387,311 B2 | 6/2008 | Kanno et al. | |
| 7,396,044 B2 | 7/2008 | Bauer et al. | |
| 7,434,837 B2 | 10/2008 | Hotta et al. | |
| 7,438,310 B2 | 10/2008 | Takimoto et al. | |
| 7,448,646 B2* | 11/2008 | Hall | B60R 21/2338 280/739 |
| 7,487,994 B2 | 2/2009 | Okada et al. | |
| 7,510,212 B2* | 3/2009 | Green | B60R 21/2338 280/738 |
| 7,549,672 B2 | 6/2009 | Sato et al. | |
| 7,566,074 B2 | 7/2009 | Hawthorn et al. | |
| 7,568,724 B2 | 8/2009 | Kutchey et al. | |
| 7,568,730 B2 | 8/2009 | Kwon | |
| 7,631,894 B2 | 12/2009 | Hasebe et al. | |
| 7,641,223 B2 | 1/2010 | Knowlden | |
| 7,658,408 B2 | 2/2010 | Zofchak et al. | |
| 7,658,409 B2 | 2/2010 | Ford et al. | |
| 7,690,683 B2* | 4/2010 | Parks | B60R 21/239 280/739 |
| 7,695,013 B2 | 4/2010 | Kakstis et al. | |
| 7,712,769 B2 | 5/2010 | Hasebe et al. | |
| 7,717,460 B2 | 5/2010 | Franke et al. | |
| 7,731,233 B2* | 6/2010 | Schneider | B60R 21/239 280/739 |
| 7,744,118 B2 | 6/2010 | Takimoto et al. | |
| 7,748,739 B2 | 7/2010 | Brinker | |
| 7,753,405 B2 | 7/2010 | Ishiguro et al. | |
| 7,753,407 B2 | 7/2010 | Yokota | |
| 7,766,374 B2 | 8/2010 | Abele et al. | |
| 7,775,549 B2* | 8/2010 | Einsiedel | B60R 21/213 280/728.2 |
| 7,793,973 B2 | 9/2010 | Sato et al. | |
| 7,798,517 B2 | 9/2010 | Ishida | |
| 7,819,419 B2 | 10/2010 | Hayashi et al. | |
| 7,878,540 B2 | 2/2011 | Takimoto et al. | |
| 8,083,254 B2 | 12/2011 | Enders et al. | |
| 8,118,325 B2 | 2/2012 | Enders et al. | |
| 8,186,714 B2* | 5/2012 | Schneider | B60R 21/239 280/739 |
| 8,272,667 B2 | 9/2012 | Schneider et al. | |
| 8,297,649 B2 | 10/2012 | Enders | |
| 8,297,650 B2 | 10/2012 | Enders | |
| 8,353,525 B2* | 1/2013 | Parks | B60R 21/2338 280/728.2 |
| 8,388,021 B2* | 3/2013 | Mitsuo | B60R 21/205 280/728.2 |
| 8,500,155 B2 | 8/2013 | Enders | |
| 8,500,166 B2* | 8/2013 | Inuzuka | B23D 15/145 280/743.2 |
| 8,505,963 B1* | 8/2013 | Lewis | B60R 21/2171 280/728.2 |
| 10,457,240 B2* | 10/2019 | Greer, Jr. | B60R 21/206 |
| 2001/0007391 A1 | 7/2001 | Hamada et al. | |
| 2002/0044819 A1 | 4/2002 | Shamoon | |
| 2002/0149187 A1 | 10/2002 | Holtz et al. | |
| 2002/0171231 A1 | 11/2002 | Takimoto et al. | |
| 2002/0180187 A1 | 12/2002 | Hayashi | |
| 2003/0034637 A1 | 2/2003 | Wang et al. | |
| 2003/0209888 A1 | 11/2003 | Davis, Jr. et al. | |
| 2005/0001412 A1 | 1/2005 | Schneider et al. | |
| 2005/0057028 A1 | 3/2005 | Hayakawa | |
| 2005/0062265 A1 | 3/2005 | HOtta et al. | |
| 2005/0151351 A1 | 7/2005 | Enders et al. | |
| 2005/0194767 A1 | 9/2005 | Freisler et al. | |
| 2005/0194771 A1 | 9/2005 | Clark et al. | |
| 2005/0212275 A1 | 9/2005 | Hasebe | |
| 2005/0230939 A1 | 10/2005 | Abe et al. | |
| 2006/0192370 A1* | 8/2006 | Abe | B60R 21/0132 280/735 |
| 2006/0244247 A1* | 11/2006 | Debler | B60R 21/2338 280/739 |
| 2006/0279073 A1 | 12/2006 | Hotta et al. | |
| 2007/0057487 A1 | 3/2007 | Kim | |
| 2007/0120346 A1 | 5/2007 | Kwon | |
| 2007/0170709 A1* | 7/2007 | Braun | B60R 21/205 280/739 |
| 2007/0200321 A1 | 8/2007 | Heitplatz et al. | |
| 2007/0246920 A1 | 10/2007 | Abele et al. | |
| 2007/0267852 A1 | 11/2007 | Enders | |
| 2008/0048418 A1 | 2/2008 | Remley et al. | |
| 2008/0157509 A1 | 7/2008 | Abe et al. | |
| 2008/0217892 A1 | 9/2008 | Maripudi et al. | |
| 2008/0238048 A1 | 10/2008 | Ishida | |
| 2009/0045607 A1 | 2/2009 | Fukuyama et al. | |
| 2009/0058048 A1 | 3/2009 | Ishida et al. | |

(56) References Cited

U.S. PATENT DOCUMENTS

| | | |
|---|---|---|
| 2009/0058052 A1 | 3/2009 | Ford et al. |
| 2009/0085333 A1 | 4/2009 | Imaeda et al. |
| 2009/0134611 A1 | 5/2009 | Wigger et al. |
| 2009/0146400 A1 | 6/2009 | Knowlden |
| 2009/0152842 A1 | 6/2009 | Benny et al. |
| 2009/0152847 A1 | 6/2009 | Hong et al. |
| 2009/0184498 A1 | 7/2009 | Takimoto et al. |
| 2009/0212541 A1 | 8/2009 | Wallat et al. |
| 2009/0242308 A1 | 10/2009 | Kitte et al. |
| 2010/0025973 A1 | 2/2010 | Jang et al. |
| 2010/0090445 A1 | 4/2010 | Williams et al. |
| 2010/0270775 A1 | 10/2010 | Enders et al. |
| 2010/0270779 A1 | 10/2010 | Enders et al. |
| 2010/0270782 A1 | 10/2010 | Enders et al. |
| 2011/0012327 A1 | 1/2011 | Enders |
| 2011/0101660 A1 | 5/2011 | Schneider et al. |
| 2011/0148077 A1 | 6/2011 | Enders |
| 2012/0025496 A1 | 2/2012 | Schneider et al. |
| 2012/0049488 A1 | 3/2012 | Enders |
| 2012/0049497 A1 | 3/2012 | Enders |

FOREIGN PATENT DOCUMENTS

| | | |
|---|---|---|
| WO | 2002004262 | 1/2002 |
| WO | 2010126623 A1 | 11/2010 |
| WO | 2011008916 A1 | 1/2011 |
| WO | 2011056810 A1 | 5/2011 |
| WO | 2011079178 A1 | 6/2011 |
| WO | 2012030482 A1 | 3/2012 |
| WO | 2017137387 A1 | 8/2017 |

* cited by examiner

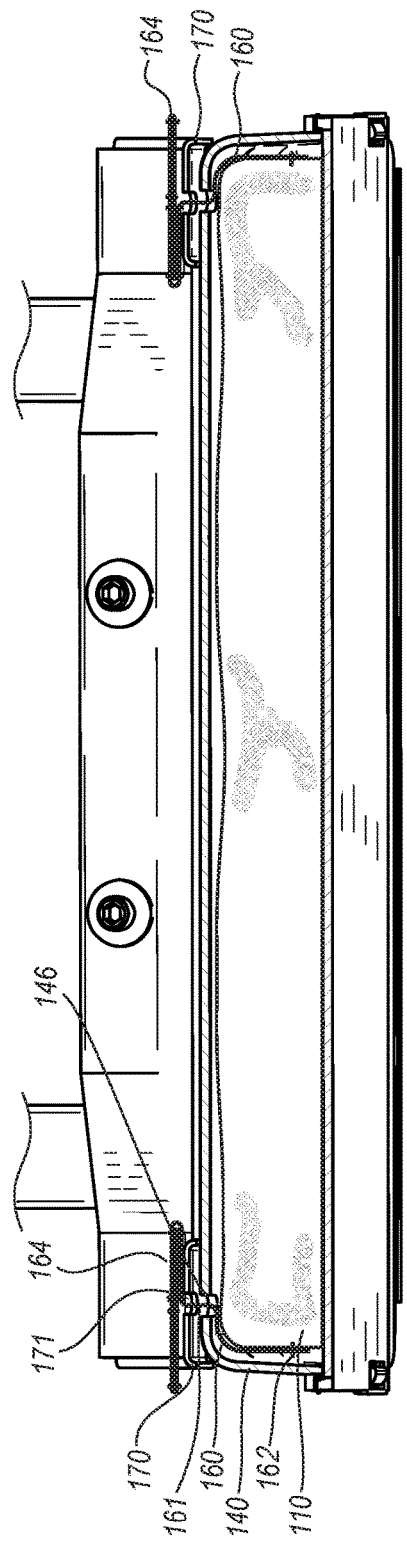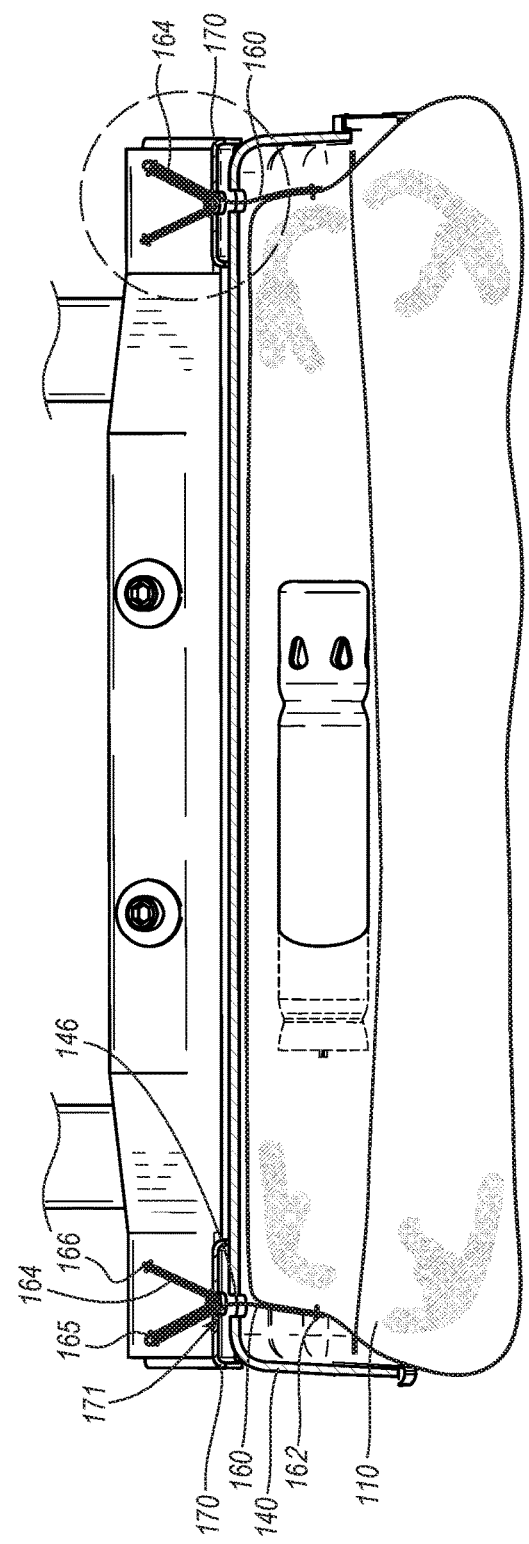

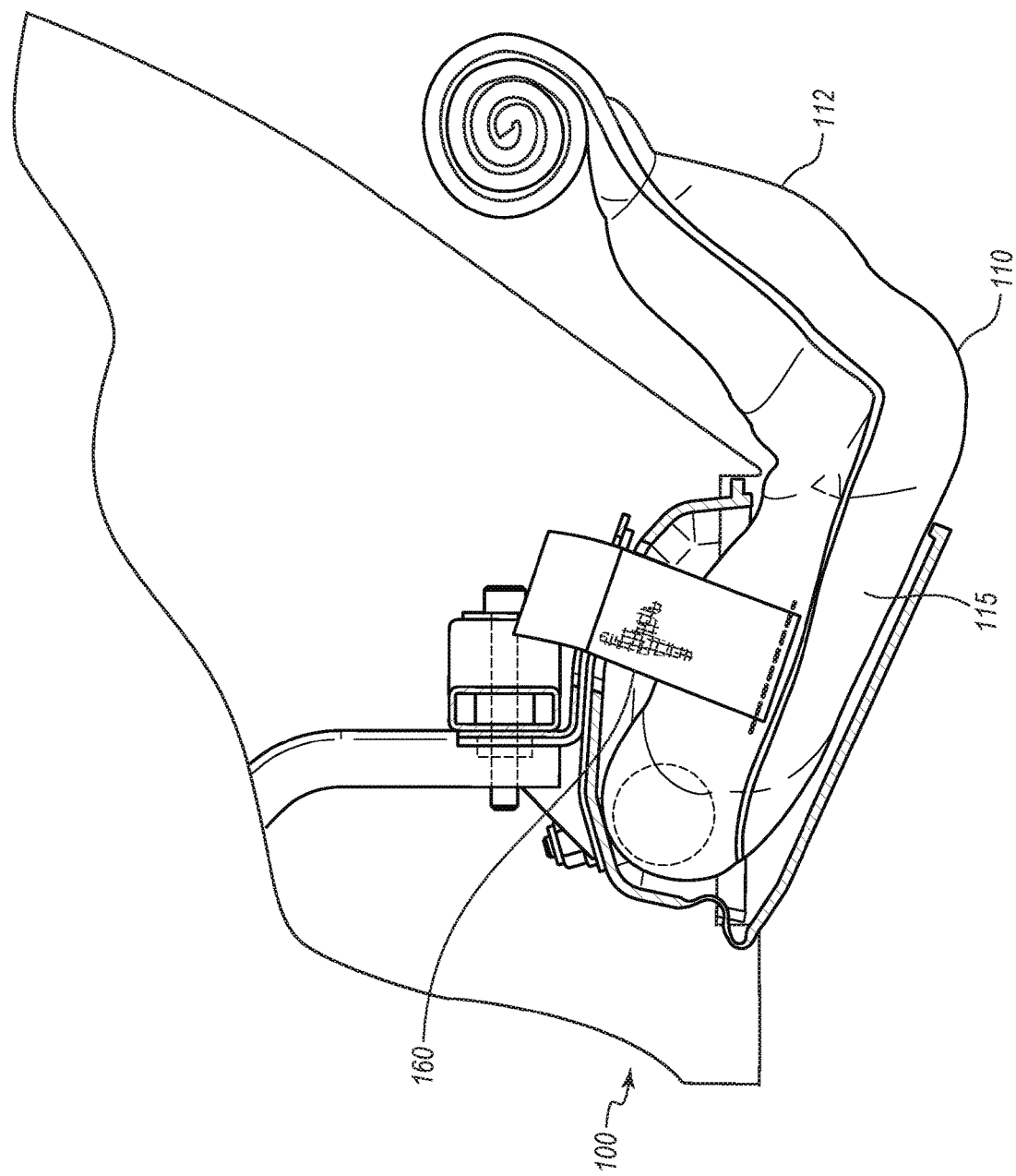

INFLATABLE KNEE AIRBAG ASSEMBLIES

TECHNICAL FIELD

The present disclosure relates generally to the field of protection systems for vehicle occupants. More particularly, the present disclosure relates to airbag assemblies, such as inflatable knee airbag assemblies including a support and/or stabilizing strap configured to direct airbag cushion deployment.

BACKGROUND

Protection systems have been installed in vehicles to protect an occupant during a collision event. Some protection systems include inflatable knee airbags. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 5A is a longitudinal cross-section view of a portion of the inflatable airbag assembly of FIG. 1A prior to deployment of an airbag cushion.

FIG. 5B is a longitudinal cross-section view of a portion of the inflatable airbag assembly of FIG. 5A following deployment of the airbag cushion.

FIG. 6C is a side cross-section view of a portion of the inflatable airbag assembly of FIG. 6B at a second stage of deployment of the airbag cushion.

DETAILED DESCRIPTION

Figure 1A:
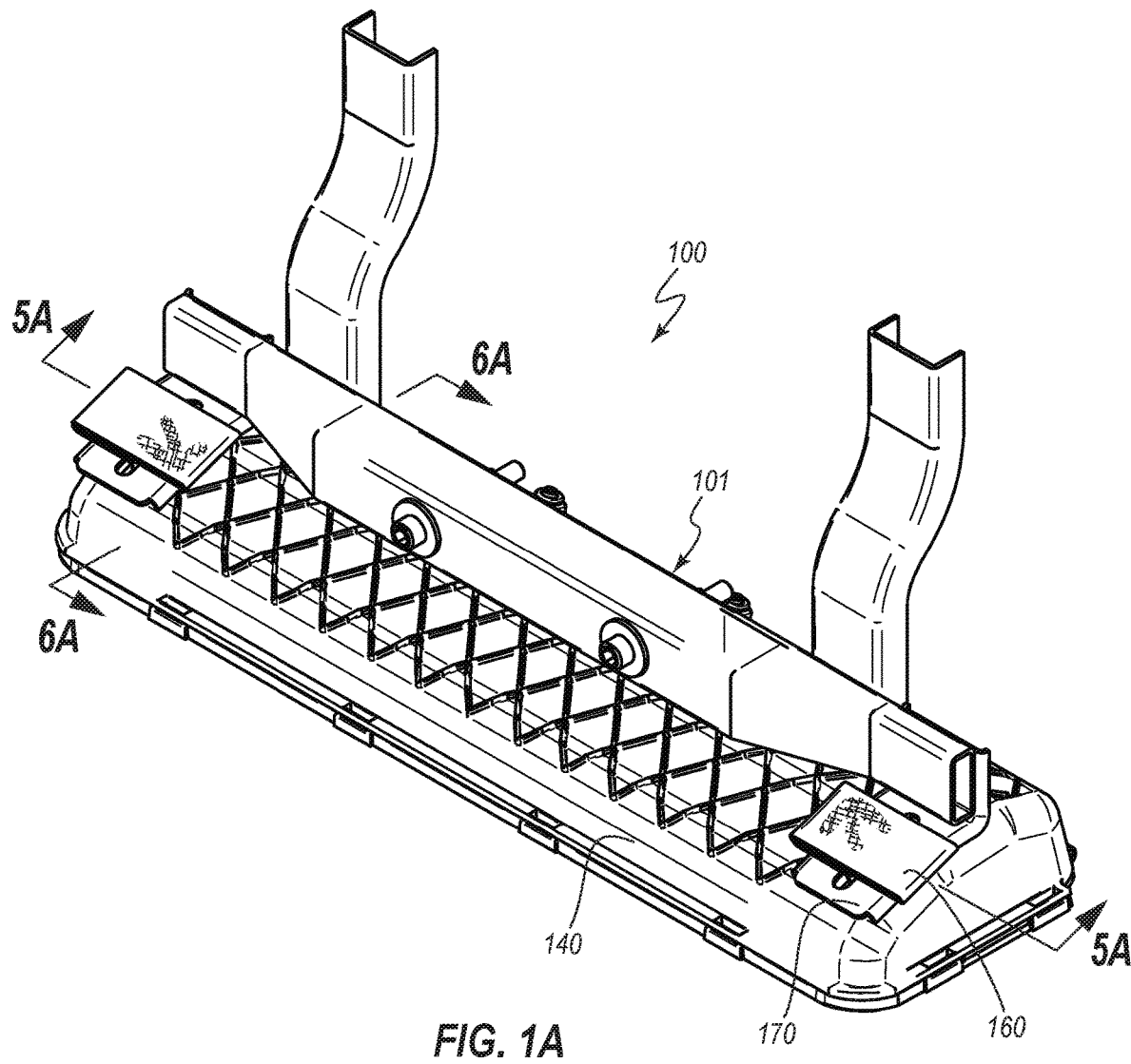
FIG. 1A is a perspective view of an inflatable airbag assembly, according to one embodiment of the present disclosure.

Occupant protection systems, such as airbag assemblies, may be installed at various locations within a vehicle to reduce or minimize occupant injury during a collision event. In the following disclosure, specific reference is made to airbag assemblies that are designed to deploy in the direction of a knee area of an occupant seated in a vehicle seating position, although the principles discussed herein may apply to other types of airbag assemblies that are designed to cushion other portions of an occupant.

Airbag assemblies generally include an airbag cushion. The airbag cushion is typically disposed within a housing in a packaged state (e.g., rolled, folded, and/or otherwise compressed) and may be retained in the packaged state behind a cover. During a collision event, an inflator may be triggered, which rapidly fills the airbag cushion with inflation gas. The inflation gas may cause the airbag cushion to rapidly transition from a compact packaged (i.e., un-deployed) state to an expanded or deployed state. In some embodiments, the expanding airbag cushion opens an airbag cover (e.g., by tearing through a tear seam or opening a door-like structure) to exit the housing. The inflator may be triggered by any suitable device or system, and the triggering may be in response to and/or influenced by one or more vehicle sensors.

Airbag assemblies can also include a knee restraint or knee airbag to protect the hips, knees and/or lower leg of an occupant during a collision event. Such knee restraints may absorb at least some of the impact energy of an occupant during a collision event, especially by restraining the lower torso by means of applying a force to the knees. In some embodiments, the knee restraint may comprise an airbag cushion that contacts and cushions the knees of an occupant during a collision event.

Some embodiments of airbag assemblies disclosed herein may be useful for protecting occupants seated in a front seat of a vehicle. Other embodiments of the airbag assemblies disclosed herein may be particularly useful for protecting occupants who are seated rearward of the front seats of a vehicle.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The terms "connect" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" and "secured to" refer to interaction between two or more entities that are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" are used with reference to the front and back of the relevant vehicle. For example, an airbag cushion that deploys in a rearward direction deploys toward the back of a vehicle.

The directional terms "proximal" and "distal" are used herein to refer to opposite locations on an airbag cushion. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seat back from which an airbag deploys. Specifically, "proximal" is situated toward such point of attachment and "distal" is situated away from such point of attachment.

The term "seat," as used herein, refers to a structure within the cabin of a vehicle installed such that an occupant may be seated thereon/therein for transport within the vehicle.

The term "front seat," as used herein, refers to any seat that is disposed immediately rearward of the instrument panel, regardless of whether disposed to either side of the vehicle, and which is disposed forward of any "back seat(s)" (defined below) which may be present in the vehicle.

The term "back seat," as used herein, refers to any seat that is disposed rearward of the front seat(s) of a vehicle, regardless of whether the seat is the most rearward seat in the vehicle. The term "back seat" also refers to any seat that is disposed rearward of other back seats.

A "vehicle seating position" may be defined by a seat (e.g., a front passenger seat, a front driver seat, a back seat) of a vehicle. A vehicle seating position may be the position in which an occupant is generally positioned when seated in a seat of a vehicle. A vehicle seating position may also be a position in which an occupant may be seated prior to and/or during a collision event or a position in which the vehicle and/or the seat is designed to transport an occupant.

The term "vehicle" may refer to any vehicle, such as a car, truck, bus, airplane, etc.

The term "occupant" generally refers to a person within a vehicle. The term "occupant" can also include a crash test dummy within a vehicle.

Figure 1B:
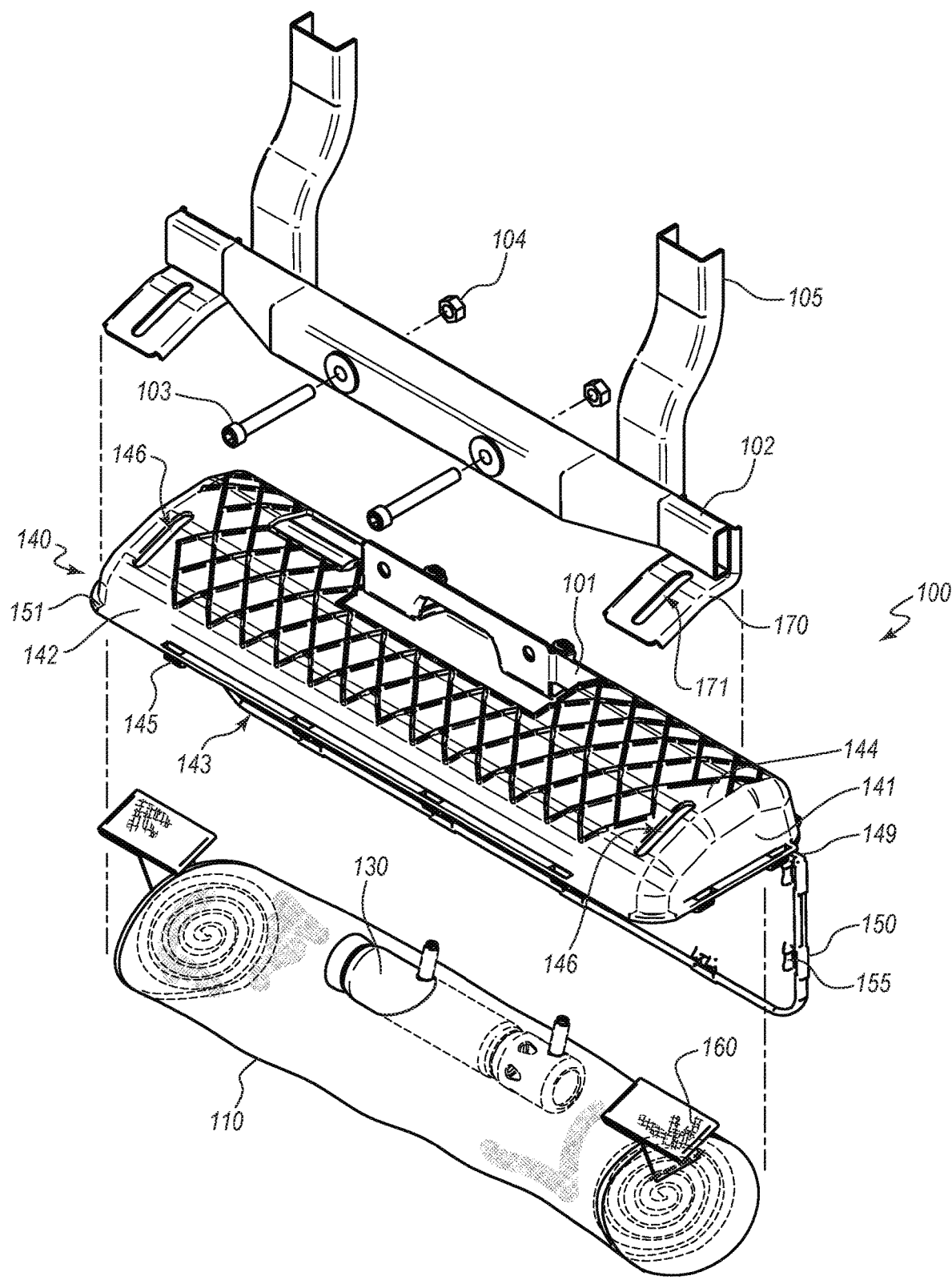
FIG. 1B is a perspective exploded view of the inflatable airbag assembly of FIG. 1.

FIGS. 1A and 1B are a perspective view and a perspective exploded view of an airbag assembly 100, respectively. The airbag assembly 100 may comprise a housing 140, a housing mounting bracket 101, an airbag cushion 110, and an inflator 130. A support bracket 170 and/or a support strap 160 may couple the airbag assembly 100 to a vehicle structure 102. The airbag assembly 100 may be mounted within a vehicle at or below a knee bolster portion of an instrument panel or below a steering wheel. Alternatively, the airbag assembly 100 may be mounted within a vehicle at any other suitable location, such as forward of a passenger front seat to protect the head and torso of an occupant, forward of a back seat at a position below a knee level of an occupant seated in a vehicle seating position, etc.

The housing 140 comprises an integrated cover 150, such that the housing 140 may be said to comprise a one-piece housing with a cover 150 that is attached via a hinge 149. The housing 140 may be a clamshell container comprising two portions (namely the cover 150 as a first portion and a container 151 as a second portion) joined via the hinge 149. The housing 140 may comprise a contiguous piece of a molded plastic material that forms an enclosure or container 151 with an interior space 143. The container 151 may comprise one or more (e.g., four) sidewalls and/or a primary wall 144, which define the interior space 143. The hinge 149 may be a living hinge in the form of the same material as the cover 150 and the container 151. A plurality of cover closure structures 145, 155 may secure the cover 150 to the container 151 in a closed position.

The plurality of sidewalls of the housing 140 may comprise longitudinal sidewalls 142 and lateral sidewalls 141. The primary wall 144 may comprise a single, linear surface, or a plurality of surfaces, as depicted in FIGS. 1A and 1B. The primary wall 144 may span the housing and/or the interior space 143 opposite the cover 150 (or opposite an opening of the housing 140 that is closed by the cover 150). In the embodiment of FIGS. 1A and 1B, the primary wall 144 may have a convex shape, giving the outside of the housing 140 (and correspondingly the interior space 143) a rounder shape. The cover closure structures 145 may each comprise a protrusion that is configured to interact with a structure of complementing cover closure structures 155. The cover 150 may comprise a plurality of complementing cover closure structures 155.

The primary wall 144 of the housing 140 may comprise one or more apertures 146. A length of the apertures 146 may be greater than a width, so as to form a narrow slot as shown in FIGS. 1A and 1B. The apertures 146 may be oriented such that the length is parallel to the lateral sidewalls 141 of the housing 140.

The housing 140 and the cover 150 may comprise one or more of several materials that are well known in the art, including: nylon; styrene ethylene butylene styrene block coplymers (SEBS); polyolefin monomers or co-block polymers; polypropylene monomers or co-block polymers; thermoplastic elastomer olefin (TEO); and thermoplastic polyester elastomers (TPE). These materials may be sold under the following trade names: Hytrel; Tefabloc; Tosl; Sumitomo; Tekron; Basell; Hostacom; Multiflex; and TES.

The housing 140 may be configured to be mounted to a vehicle structure 102. The vehicle structure 102 may be configured as a mounting member, such as a cross car beam (CCB). The housing 140 may be mounted to the vehicle structure using the housing mounting bracket 101. The housing mounting bracket 101 may be configured as an "L" bracket with a horizontal portion and a vertical portion. The housing mounting bracket 101 may be configured to have a length that is less than the length of the housing 140. In some embodiments, the length of housing bracket 101 may be configured to be less than 75% of the length of the housing 140. The length of the housing bracket 101 may be such that it is configured to be positioned between CCB support arms 105, or other vehicle structure supporting the vehicle structure 102. The housing mounting bracket 101 may be mounted to the vehicle structure 102 by securing the housing mounting bracket 101 to the vehicle structure 102 using a bracket mounting structure 103. The bracket mounting structure 103 may comprise a mounting stem, such as a threaded bolt. The bracket mounting structure 103 may be configured to protrude through apertures in the vehicle structure 102, the housing mounting bracket 101, and a complementary mounting hardware, such as nut 104.

The vehicle structure 102 may include one or more support brackets 170. The support bracket 170 may comprise a vertical portion and an extending portion that is configured to conform to the shape of an outer surface of the primary wall 144 of the housing 140. The lateral edges of the support bracket 170 may be rolled such that additional flexural strength is provided. The support bracket 170 may comprise a slot 171. The slot 171 may have a length that is greater than a width. The slot 171 may be oriented such that the length is aligned with a longitudinal axis of the extending portion of the support bracket 170. The slot 171 may be configured to align with the aperture 146 of the housing 140 when the support bracket 170 is coupled to the primary wall 144. The support bracket 170 may be comprised of any suitable metal material, such as steel, aluminum, engineered thermoplastics or a composite, etc. The support bracket 170 may be fixedly secured to the vehicle structure 102 using any suitable technique such as welding, adhesive, fasteners, etc. In other embodiments, the support bracket 170 may be removably secured to the vehicle structure 102 utilizing a mounting structure such as a threaded bolt and nut. In other embodiments, the airbag assembly 100 may include one or more support brackets 170 to secure to, or otherwise couple to, the vehicle structure 102. In some embodiments, the support bracket 170 and the mounting bracket 101 may be formed as an integral unit wherein the integral unit is configured to be mounted to the vehicle structure 102. In some embodiments, the support bracket(s) 170 may be formed integral with the housing 140 (e.g., the primary wall 144). In some embodiments, the mounting bracket may be formed integral with the housing 140 (e.g., the primary wall 144).

Figure 2:
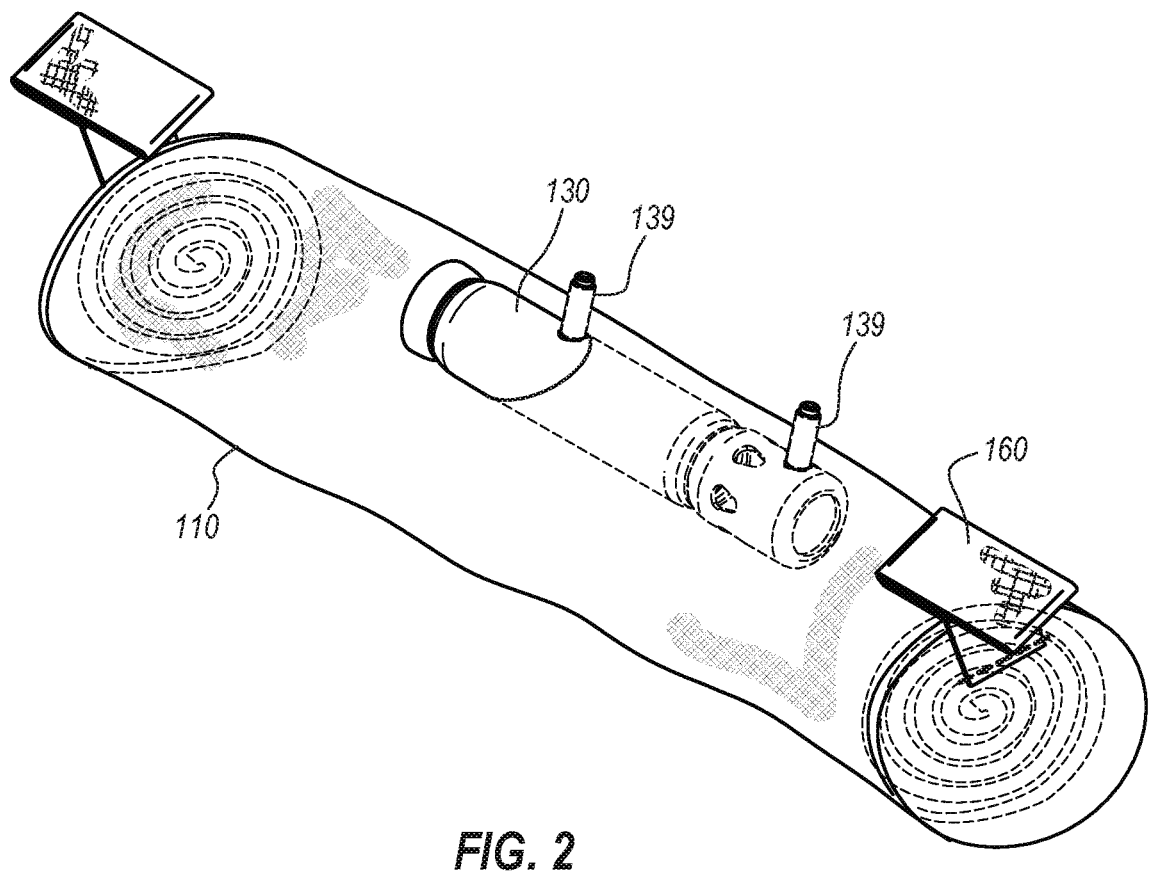
FIG. 2 is a perspective view of an inflatable airbag cushion in a rolled state and associated inflator, according to one embodiment of the present disclosure.

Referring to FIG. 2, the inflator 130 may comprise one or more mounting structures 139, which may comprise mounting stems, such as a threaded bolt. The mounting structure 139 is configured to protrude through apertures in the inflatable airbag cushion 110, the housing 140, the housing mounting bracket 101, and a complementary mounting hardware, such as a nut. Stated otherwise, the mounting structures 139 of the inflator 130 may secure the inflator 130, the inflatable airbag cushion 110 and the housing 140 to the mounting bracket 101 for coupling to the vehicle structure 102.

Figure 3:
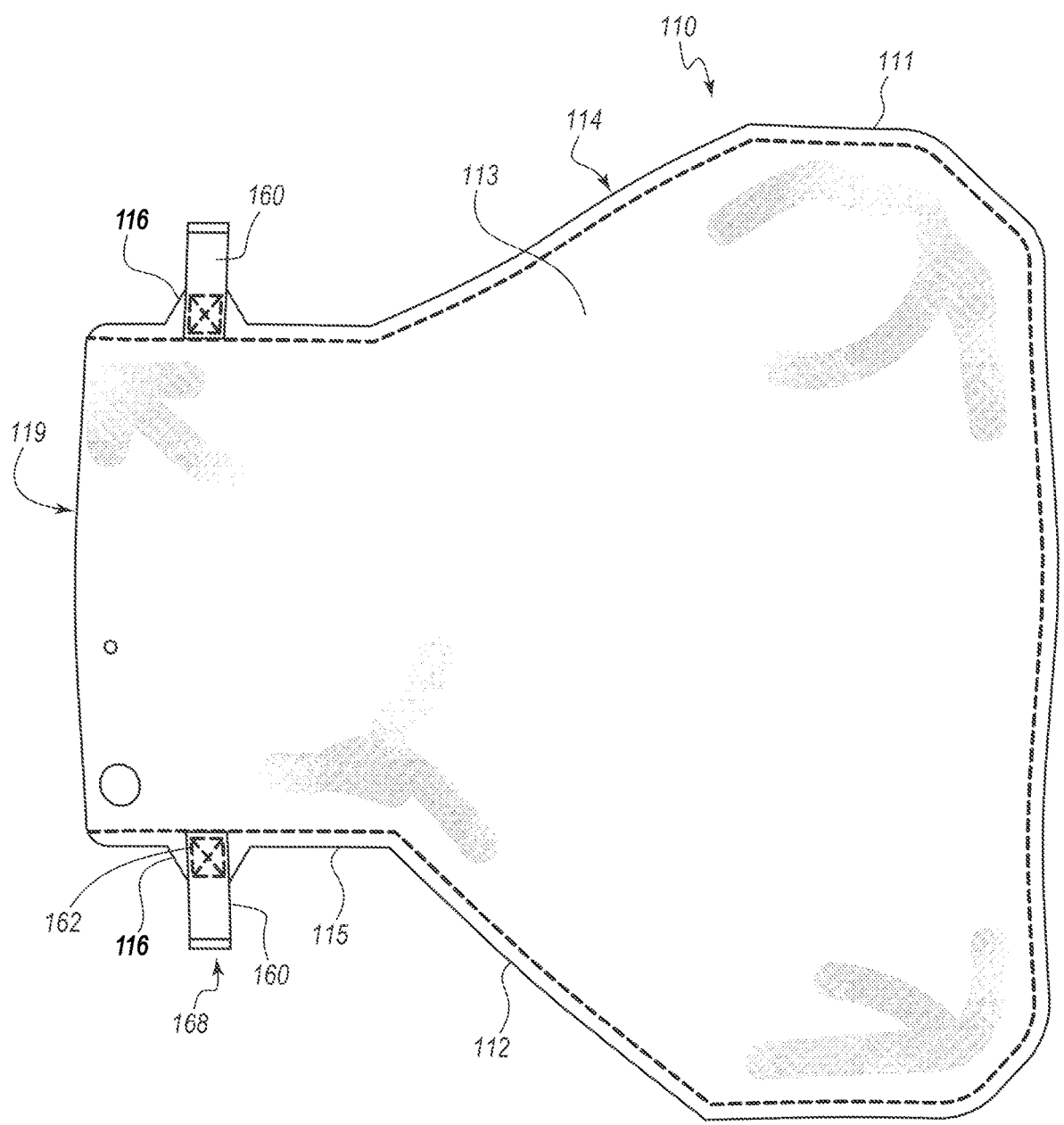
FIG. 3 is an elevation view of an inflatable airbag cushion laying flat.
Figure 6A:
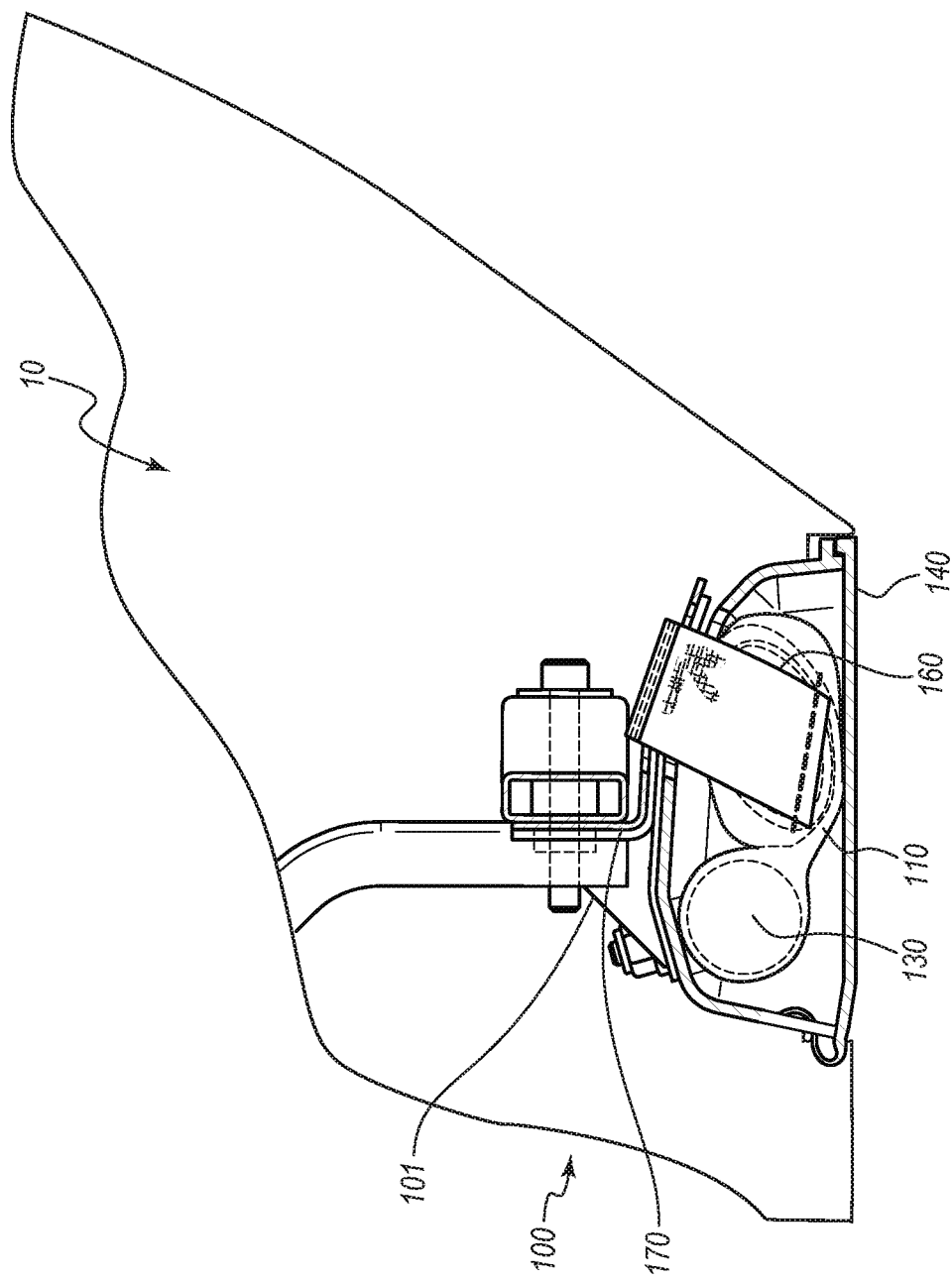
FIG. 6A is a side cross-section view of a portion of the inflatable airbag assembly of FIG. 1A prior to deployment of the airbag cushion.
Figure 6B:
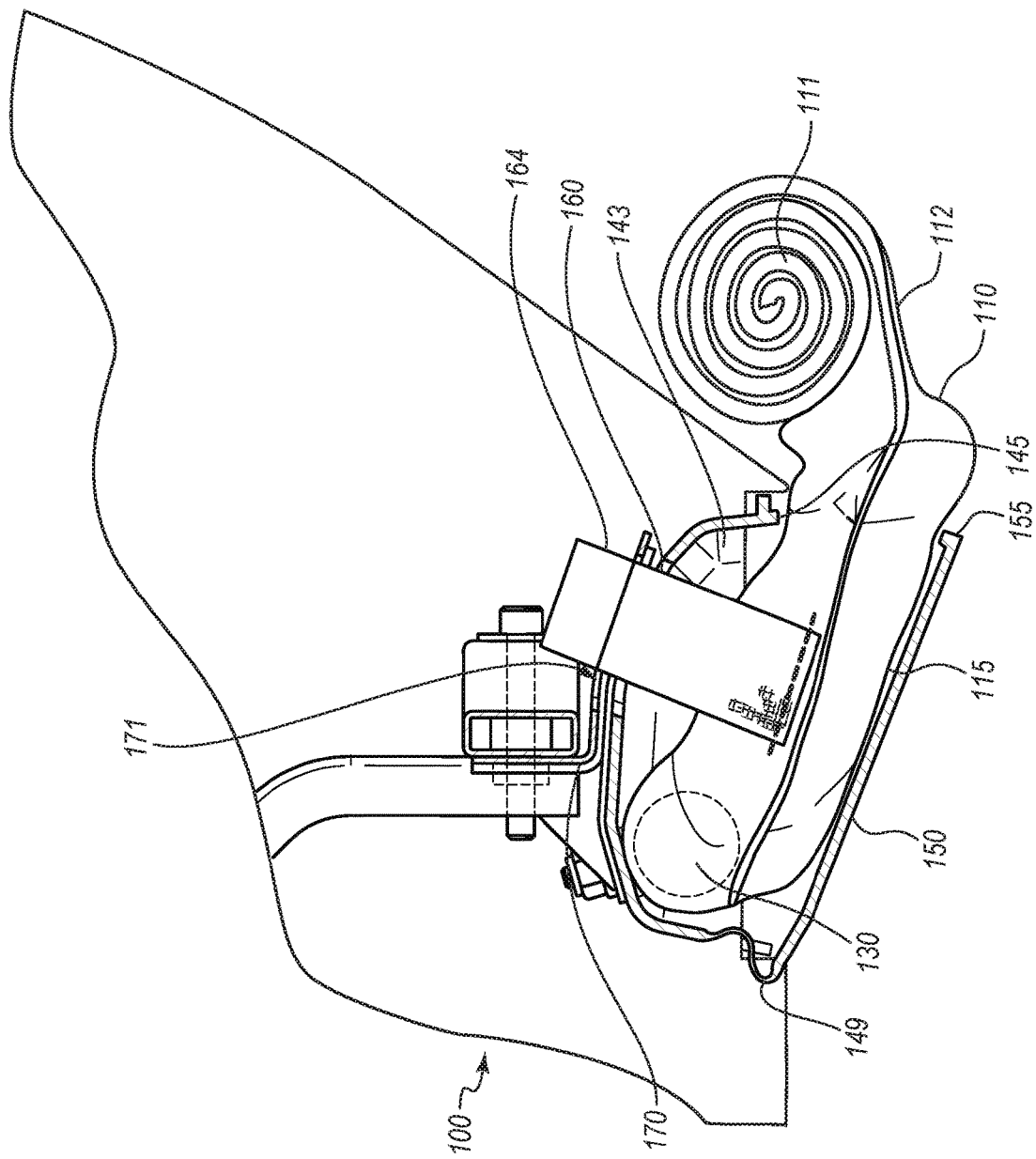
FIG. 6B is a side cross-section view of a portion of the inflatable airbag assembly of FIG. 6A at a first stage of deployment of the airbag cushion.
Figure 6D:
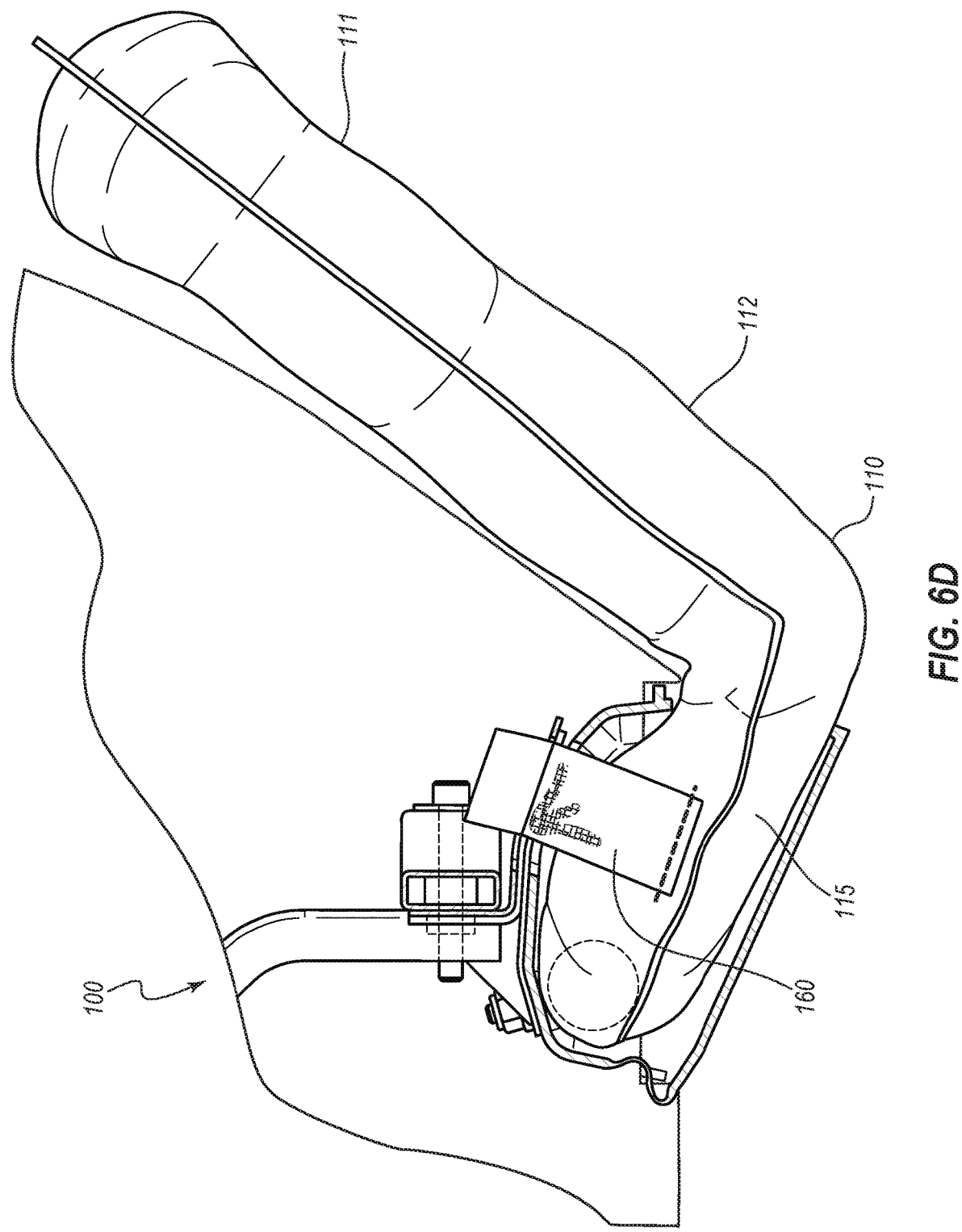
FIG. 6D is a side cross-section view of a portion of the inflatable airbag assembly of FIG. 6C at a third stage of deployment of the airbag cushion.

Referring to FIG. 3, the airbag 110 is configured to inflate upon activation of the inflator 130 such that the inflatable airbag cushion 110 transitions from a packaged configuration (as shown in FIG. 6A) to a deployed configuration (as shown in FIG. 6D). The airbag 110 may comprise an upper portion 111, a lower portion 112, a first face 113, a second face 114, and a proximal or a throat portion 115. The volume of the upper portion 111 may be larger than the volume of the lower portion 112 which may be larger than the throat portion 115. The various faces 113, 114 of the inflatable airbag 110 define an interior inflatable void 119, which is in fluid communication with the inflator 130 so as to receive inflation gas from the inflator 130. The various faces 113, 114 of the inflatable airbag 110 may comprise separate panels of material, or may be formed from a single panel of material that is folded. The airbag cushion 110 may comprise a woven nylon fabric.

The upper portion 111 of the airbag cushion 110 is the portion of the airbag that is closest to the headliner of a vehicle when the airbag cushion 110 is in a deployed state. The lower portion 112 is below the upper portion 111 when the inflatable airbag cushion 110 is in a deployed state, and is closest to a floor of the vehicle. The term "lower portion" is not necessarily limited to the portion of inflatable airbag cushion 110 that is below a horizontal medial plane of the inflatable airbag, but may include less than half, more than half or exactly half of the bottom portion of the inflatable airbag cushion 110. Likewise, the term "upper portion" is not necessarily limited to the portion of inflatable airbag cushion 110 that is above a horizontal medial plane of the inflatable airbag cushion 110, but may include less than half, more than half or exactly half of the top portion of the inflatable airbag cushion 110.

The airbag cushion 110 may comprise an attachment position 116 located on a lateral portion adjacent the throat portion 115. The attachment position 116 may be configured to extend outward from the airbag cushion 110. The attachment position 116 may extend from the first face 113 and/or the second face 114. The attachment position 116 may be integral with the first face 113 and/or the second face 114. For example, the attachment position 116 may form a portion of selvage of the airbag cushion 110. In other embodiments, the attachment position 116 may be attached to the first face 113 and/or the second face 114 using any suitable technique, such as sewing, gluing, etc.

Figure 4A:
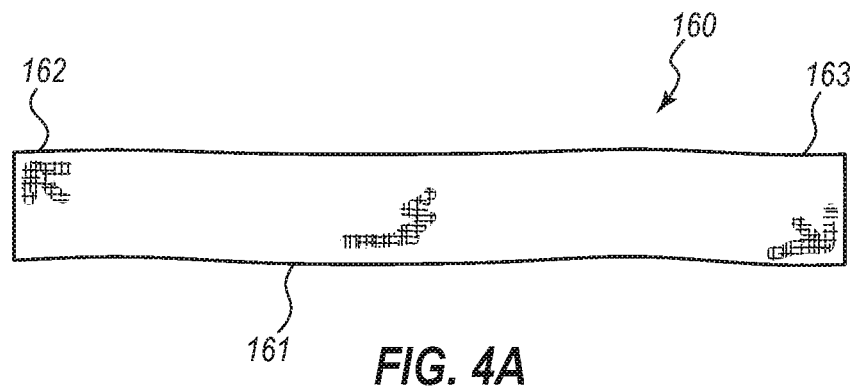
FIG. 4A is an elevation view of a support strap.
Figure 4B:
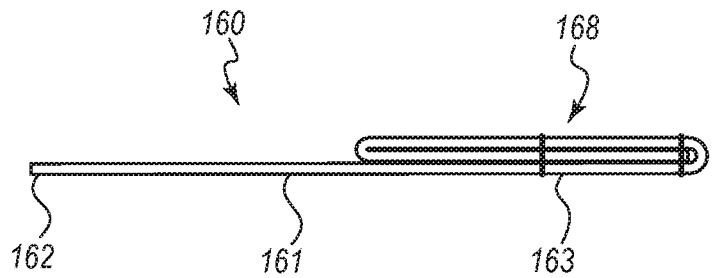
FIG. 4B is a side view of the support strap of FIG. 4A with a fastening end folded to form a fastener.
Figure 4C:
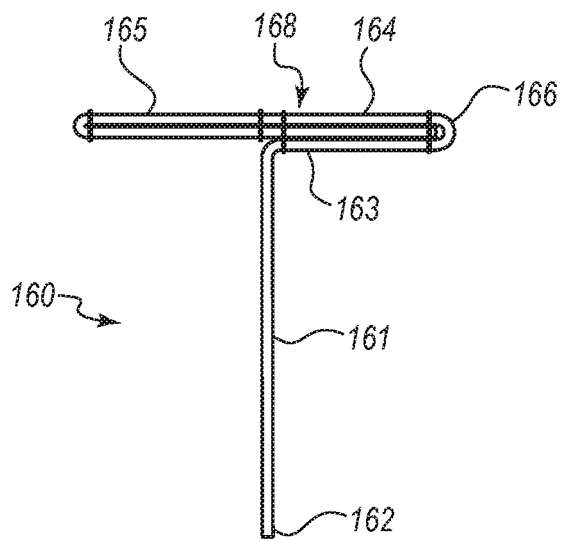
FIG. 4C is a side view of the support strap of FIG. 4B with fastening end configured to orient a portion of the fastener with a transverse end portion, to form a t-shape.

Referring to FIGS. 4A-4C, the support strap 160 may be configured to direct the movement of the airbag cushion 110 in a predetermined direction or deployment trajectory. The support strap 160 may provide resistance to the airbag cushion during deployment, wherein the strap resists the movement of the airbag cushion 110 in a vehicle forward and downward direction. Thus, the airbag cushion 110 is directed by the support strap 160 during deployment in a car rearward and upward direction. The support strap 160 may comprise a strap portion 161, a first end 162 or secured end, and a second end 163 or fastening end.

The support strap 160 may comprise a woven material, such as a woven nylon material. Other materials, such as woven polyester, woven polypropylene, natural or other synthetic fibers in the form of webbing, fabric or rope with suitable tensile and elongation properties to withstand the air bag loads, etc., may be utilized and are contemplated within the scope of the disclosure. The support strap may have a length greater than a width. The second end 163 or fastening end of the support strap 160 is configured to pass through the aperture 146 and slot 171. The second end 163 may include a fastener 168. In the illustrated embodiment of FIGS. 4A-4C, the fastener 168 comprises folding and securing of the folds to configure the second end as a "T" shape with a transverse portion 164 oriented perpendicular to the strap portion 161. The transverse portion 164 may be configured with a first arm 165 and a second arm 166. The strap portion 161 may be secured to the middle of the transverse portion 164 using a sewn stitch. The first arm 165 and the second arm 166 may comprise a plurality of folded layers of the woven material.

As illustrated in FIG. 3, the first end 162 or secured end of the support strap 160 may be secured to the attachment position 116 of the airbag cushion 110 using a box stitch sewing technique such that a width of the support strap 160 is orthogonal to a width of airbag cushion 110. In some embodiments, the support strap may be secured to the attachment position 116 using any suitable sewing technique. In other embodiments, the support strap may be secured to the first surface 113 and/or the second surface 114 at any suitable location.

Figure 5C:
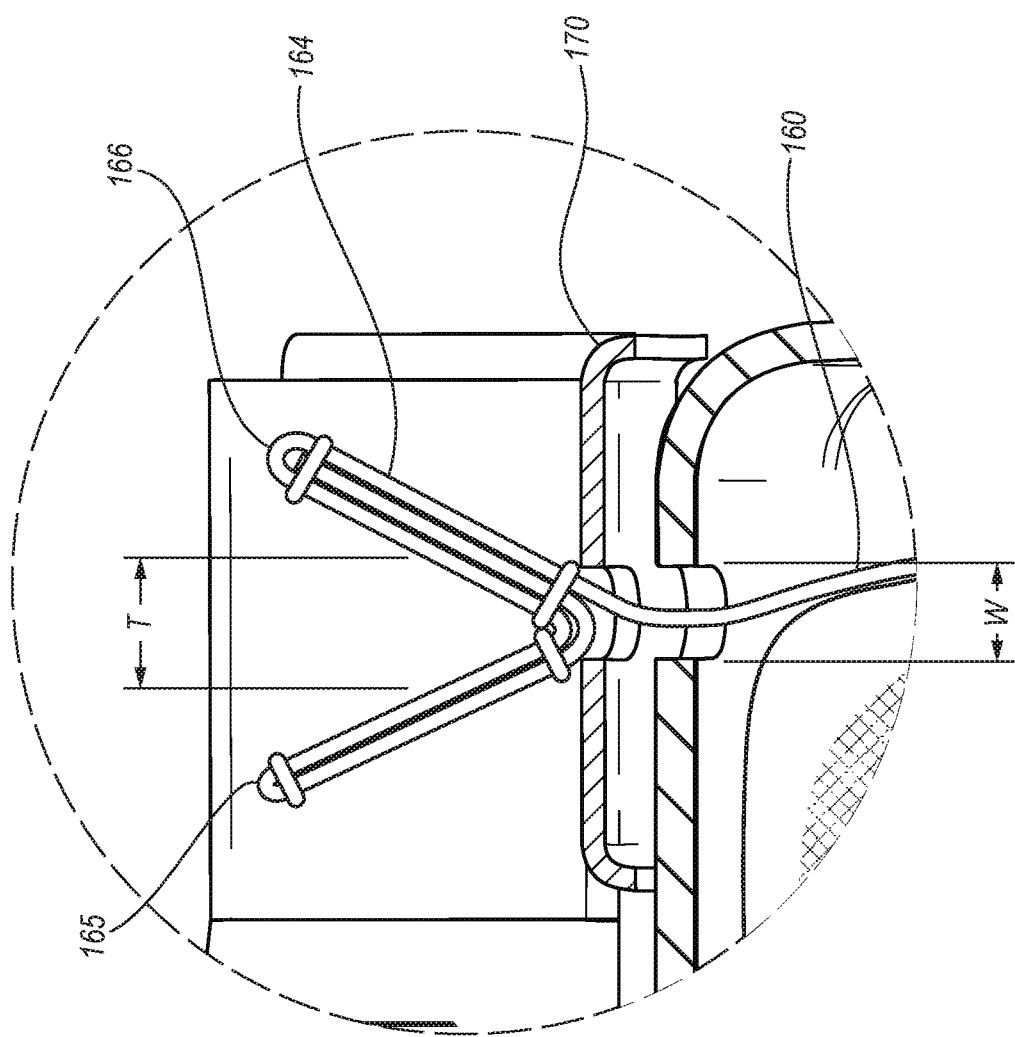
FIG. 5C is a detail view of the fastening end of the support of the inflatable airbag assembly of FIG. 5B.

FIGS. 5A-5C depict the airbag assembly 100 from a longitudinal cross-section view. FIG. 5A depicts the strap portion 161 passing through the aperture 146 and the slot 171 such that the transverse portion 164 lays flat on the support bracket 170 prior to airbag cushion 110 deployment. As illustrated in FIG. 5B, when the airbag cushion 110 is deployed, tension or a downward force is applied to the support strap 160 such that the transverse portion 164 folds upward. The first arm 165 and the second arm 166 are oriented vertically such that a combined thickness "T" of the first arm 165 and the second arm 166 is greater than the width "W" of the aperture 146 and the slot 171 as illustrated in FIG. 5C. The thickness "T" prevents the support strap 160 from being pulled into the housing 140. The support strap 160 directs deployment of the airbag cushion 110 in a predetermined or deployment trajectory.

The airbag assembly 100 may be configured to be lightweight. In one embodiment, the airbag assembly may be less than 750 grams. In other embodiments, the airbag assembly 100 may have a weight in the range 500 grams to 1000 grams. In other embodiments, the airbag assembly 100 may have a weight in the range 600 grams to 900 grams. In other embodiments, the airbag assembly 100 may have a weight in the range 700 grams to 800 grams.

FIG. 6A depicts the airbag assembly 100 from a cross-sectional side view, wherein the airbag assembly 100 has been mounted within a vehicle 10. The airbag assembly 100 may comprise the housing mounting bracket 101, the inflatable airbag cushion 110, the inflator 130, the housing 140, the support bracket 170, and the support strap 160. FIG. 6A depicts the airbag assembly 100 in the packaged configuration prior to deployment of the airbag cushion 110.

FIG. 6B is a cross-sectional side view of the airbag assembly 100 of FIG. 6A, wherein airbag cushion 110 is depicted in a first stage of deployment. The airbag cushion 110 is configured to become inflated upon activation of inflator 130 such that the inflatable airbag cushion 110 transitions from the packaged configuration to the first deployed stage configuration. In the depiction of FIG. 6B, the cover 150 has rotated about the hinge 149 such that the airbag cushion 110 can exit the interior space 143. The force of inflation gas inflating the airbag cushion 110 may apply pressure to the cover 150, thereby forcing the cover 150 to open. The cover 150 closure structure 155 has been released from closure structure 145. The force of the inflation gas inflating the airbag cushion 110 has applied tension or a downward force to the support strap 160 such that the transverse member 164 has folded upward. The thickness of the transverse member 164 in this configuration is increased such that the thickness is greater than the width of the slot 171 of the support bracket 170. The support strap 160 is prevented from pulling through the slot 171 into the interior space 143.

The airbag cushion 110 is supported by the support strap 160 such that the support strap 160 directs the trajectory of the airbag cushion deployment initially downward to open the cover 150 and then rearwardly as depicted in FIG. 6B. The support strap 160 prevents the airbag cushion 110 from deploying forwardly. Additionally, the support strap 160 has supported the airbag cushion 110 wherein expansion of the throat portion 115 of the airbag cushion 110 is restricted from expanding. The restricted throat portion 115 allows the inflation gas to be directed into the lower portion 112 and the upper portion 111 of the airbag cushion 110.

FIG. 6C is a cross-sectional side view of the airbag assembly 100 in a second stage of deployment. The force of inflation gas inflating the airbag cushion 110 has filled the lower portion 112 and the airbag cushion 110 is deploying upwardly and rearwardly. The airbag cushion 110 is supported by the support strap 160 such that the support strap 160 directs the trajectory of the airbag cushion deployment upwardly and rearwardly and restricts expansion of the throat portion 115. The support strap 160 continues to limit the airbag cushion 110 from deploying forwardly.

FIG. 6D is a cross-sectional side view of the airbag assembly 100 in a third stage of deployment. The force of inflation gas inflating the airbag cushion 110 has filled the lower portion 112 and the upper portion 111, wherein the airbag cushion 110 is deployed upwardly and rearwardly to its full extent. The airbag cushion 110 is supported by the support strap 160 such that the support strap 160 directs the trajectory of the airbag cushion deployment upwardly and rearwardly and restricts expansion of the throat portion 115.

The support strap 160 continues to prevent the airbag cushion 110 from deploying forwardly. The deployed airbag cushion 110 is positioned forward of the front seat and/or the back seat. The deployed airbag cushion 110 may be configured to protect an occupant from lower extremity injuries, such as hip, femur, knee, and/or lower leg injuries.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. Embodiments of the disclosure in which an exclusive property or privilege is claimed are defined as follows.

The invention claimed is:

1. An airbag assembly comprising:
  a housing configured to be mounted in a vehicle, wherein the housing comprises a wall comprising a first aperture;
  an inflator configured to provide inflation gas during deployment;
  an airbag cushion, wherein the airbag cushion is configured to receive inflation gas from the inflator to expand the airbag cushion during deployment; and
  a first strap, wherein a first end of the first strap is secured to the airbag cushion; and
  wherein a second end of the first strap is configured to be secured to a vehicle structure by a support bracket, wherein the support bracket comprises a slot configured to align with the first aperture, and wherein the first strap passes through the first aperture such that the second end of the first strap is secured to the vehicle structure, and wherein the second end of the first strap comprises a longitudinal portion and a cross-arm portion such that the cross-arm portion is oriented transverse to the longitudinal portion, wherein the cross-arm portion comprises a first arm and a second arm, wherein the second end is prevented from pulling through the slot and the first aperture into the housing.

2. The airbag assembly of claim 1, further comprising:
a second aperture disposed in the wall of the housing; and
a second strap, wherein a first end of the second strap is secured to the airbag cushion;
wherein a second end of the second strap passes through the second aperture such that the second end of the second strap is configured to be secured to the vehicle structure.

3. The airbag assembly of claim 1, wherein the first strap is configured to direct deployment of the airbag cushion such that the airbag cushion is deployed in front of a vehicle seating position.

4. The airbag assembly of claim 1, further comprising a first tab secured to the airbag cushion, wherein the first end of the first strap is secured to the first tab.

5. The airbag assembly of claim 4, further comprising;
a second aperture disposed in the wall of the housing;
a second tab secured to the airbag cushion; and
a second strap, wherein a first end of the second strap is secured to the second tab;
wherein a second end of the second strap passes through the second aperture such that the second end of the second strap is configured to be secured to the vehicle structure.

6. The airbag assembly of claim 1, wherein the vehicle structure is a mounting member.

7. The airbag assembly of claim 1, wherein the second end of the first strap passes through the first aperture and the slot such that the second end engages with the support bracket.

8. The airbag assembly of claim 1, wherein the support bracket is fixedly secured to the vehicle structure.

9. The airbag assembly of claim 1, wherein the support bracket is fixedly secured to the wall of the housing.

10. The airbag assembly of claim 1, wherein a thickness of the cross-arm portion, when a left arm and a right arm are folded upward together such that the cross-arm portion is axially aligned with the longitudinal portion, is greater than a width of the slot.

11. The airbag assembly of claim 1, wherein the first strap is configured to direct airbag deployment rearward and upward within the vehicle.

12. The airbag assembly of claim 1, wherein the weight of the airbag assembly is between 500 grams and 900 grams.

13. The airbag assembly of claim 1, further comprising a mounting bracket, wherein the housing is secured to the mounting bracket, wherein the mounting bracket is configured to mount the airbag assembly to the vehicle structure.

14. The airbag assembly of claim 13, wherein the mounting bracket is configured as an "L" bracket.

15. The airbag assembly of claim 14, wherein the length of the mounting bracket is less than 75% of the length of the housing.

16. The airbag assembly of claim 1, wherein the housing comprises a plastic material.

17. The airbag assembly of claim 1, wherein the housing comprises a plastic material selected from a group consisting of nylon, styrene ethylene butylene styrene, polyolefin, polypropylene, thermoplastic elastomer olefin, and thermoplastic polyester elastomers.

18. The airbag assembly of claim 1, wherein the housing comprises:
a plurality of walls configured to form a closure;
a cover coupled to the housing by a hinge; and
a plurality of closure structures configured to secure the cover in a closed configuration until adequate pressure is applied to the cover by the deploying airbag cushion;
wherein the housing, the cover, the hinge, and the the plurality of closure structures are formed as a unitary structure.

19. The airbag assembly of claim 1, wherein the first strap is configured to restrict a volume of a proximal portion of the airbag cushion when the airbag cushion is deployed.

20. The airbag assembly of claim 1, wherein the airbag assembly is configured to be mounted below a knee level of an occupant seated in a vehicle seating position.

21. The airbag assembly of claim 1, wherein the airbag cushion, when deployed, is configured to protect a knee, a femur, a lower leg and/or a hip of an occupant from injury.

22. The airbag assembly of claim 1, wherein the airbag cushion is configured to have a larger volume adjacent a distal portion relative to a middle portion.

23. A method of deploying a knee airbag system, the method comprising:
obtaining the knee airbag system comprising:
a housing configured to be mounted in a vehicle, wherein the housing comprises a wall comprising a first aperture and a second aperture;
a first support bracket comprising a first slot and a second support bracket comprising a second slot wherein the first slot is aligned with the first aperture and the second slot is aligned with the second aperture;
an inflator configured to provide inflation gas during deployment;
an airbag cushion disposed within the housing comprising a first tab and a second tab, wherein a first end of a first strap is secured to the first tab and a first end of a second strap is secured to the second tab, and wherein a second end of the first strap passes through the first aperture and the first slot and a second end of the second strap passes through the second aperture and the second slot, wherein the second ends are prevented from pulling through the apertures and slots; and
activating the inflator such that the airbag cushion is deployed from the housing, wherein the airbag cushion is directed to a position in front of a vehicle seating position.

24. The method of claim 23, further comprising restricting a volume of a proximal portion of the airbag cushion.

25. The method of claim 23, wherein the airbag cushion is configured to protect an occupant from injuring a knee, a femur, a lower leg and/or a hip.

26. An airbag deployment system comprising:
an airbag housing configured to be mounted in a vehicle, wherein the airbag housing comprises a wall comprising a first aperture and a second aperture;
an inflator configured to provide inflation gas during deployment;
an airbag cushion coupled to the airbag housing and comprising a first tab and a second tab, wherein the airbag cushion is configured to receive inflation gas from the inflator to expand the airbag cushion during deployment; and a first strap and a second strap, wherein a first end of the first strap is secured to the first tab and a first end of the second strap is secured to the second tab; and a first support bracket comprising a first slot and a second support bracket comprising a second slot, wherein the first and second support brackets are configured to be mounted to a vehicle structure with the first slot aligned with the first aperture and the second slot aligned with the second aperture;

wherein a second end of the first strap passes through the first aperture and the first slot and a second end of the second strap passes through the second aperture and the second slot such that the first strap is coupled to the first support bracket and second strap is coupled to the second support bracket;

wherein the first strap and the second strap are configured to direct deployment of the airbag cushion in front of a vehicle seating position.

27. The airbag deployment system of claim 26, wherein the second ends of the straps comprise a longitudinal portion and a cross-arm portion oriented transverse to the longitudinal portion, wherein the cross-arm portion comprises a left arm and a right arm, wherein the second ends are prevented from pulling through the apertures and the slots into the airbag housing.

28. The airbag deployment system of claim 27, wherein a thickness of the cross-arm portion, when the left arm and the right arm are folded upward together such that the cross-arm portion is axially aligned with the longitudinal portion, is greater than the width of the slots.

29. The airbag deployment system of claim 26, further comprising a mounting bracket, wherein the airbag housing is secured to the mounting bracket, wherein the mounting bracket is configured to mount the airbag deployment system to the vehicle structure.

* * * * *